United States Patent [19]

Al-Hamlan

[11] Patent Number: 5,213,130
[45] Date of Patent: May 25, 1993

[54] IRRIGATION SYSTEM

[76] Inventor: Saleh A. Al-Hamlan, P.O. Box 19200 Khaitan, Khaitan, Kuwait, 83803

[21] Appl. No.: 457,870

[22] Filed: Dec. 27, 1989

[51] Int. Cl.$^5$ .............................................. G05D 9/02
[52] U.S. Cl. .................................... 137/122; 137/422
[58] Field of Search ........................ 137/119, 122, 422

[56] References Cited

U.S. PATENT DOCUMENTS

| | | | |
|---|---|---|---|
| 2,145,820 | 1/1939 | Tucker | 137/122 X |
| 2,362,747 | 11/1944 | Duke . | |
| 2,660,188 | 11/1953 | McCartney | 137/122 |
| 3,042,074 | 7/1962 | Greybill | 137/122 X |
| 3,797,253 | 3/1974 | Rodieck . | |
| 3,951,163 | 4/1976 | Rodieck . | |
| 4,014,361 | 3/1977 | Rodieck . | |
| 4,497,333 | 2/1985 | Rodieck . | |

Primary Examiner—Robert G. Nilson
Attorney, Agent, or Firm—Bacon & Thomas

[57] ABSTRACT

An irrigation system includes one or more valve assemblies which are connected in series to a pressurized source of water. Each valve assembly includes a cylindrical housing, a ball valve, an inlet and two outlets with one outlet generally opposite from the inlet in a lower portion of the housing. The other outlet is disposed in an upper portion of the housing and adapted to direct water to an area of ground for irrigation. A pit and float are associated with each valve assembly and arranged so that some of the irrigation water will flow into the pit and raise the float. The float is connected to spring biasing means and when the float reaches a predetermined level, the ball valve will spring upwardly to close the upper outlet and redirect the water to another assembly. Water pressure will then maintain the valve in that position.

6 Claims, 4 Drawing Sheets

FIG_1

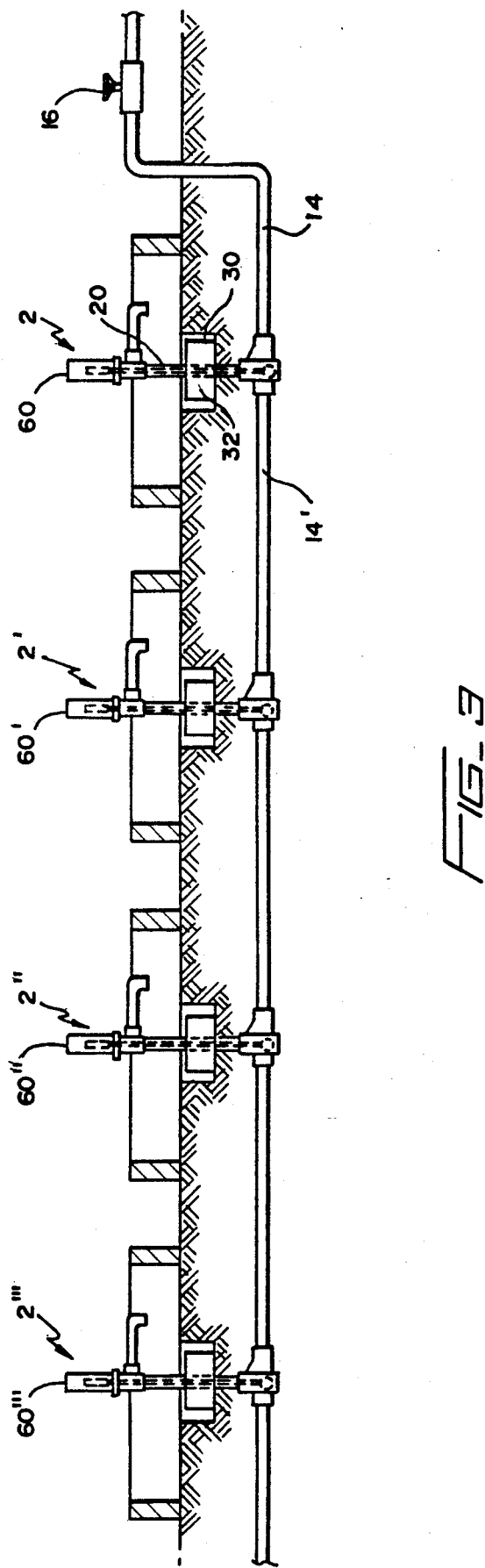

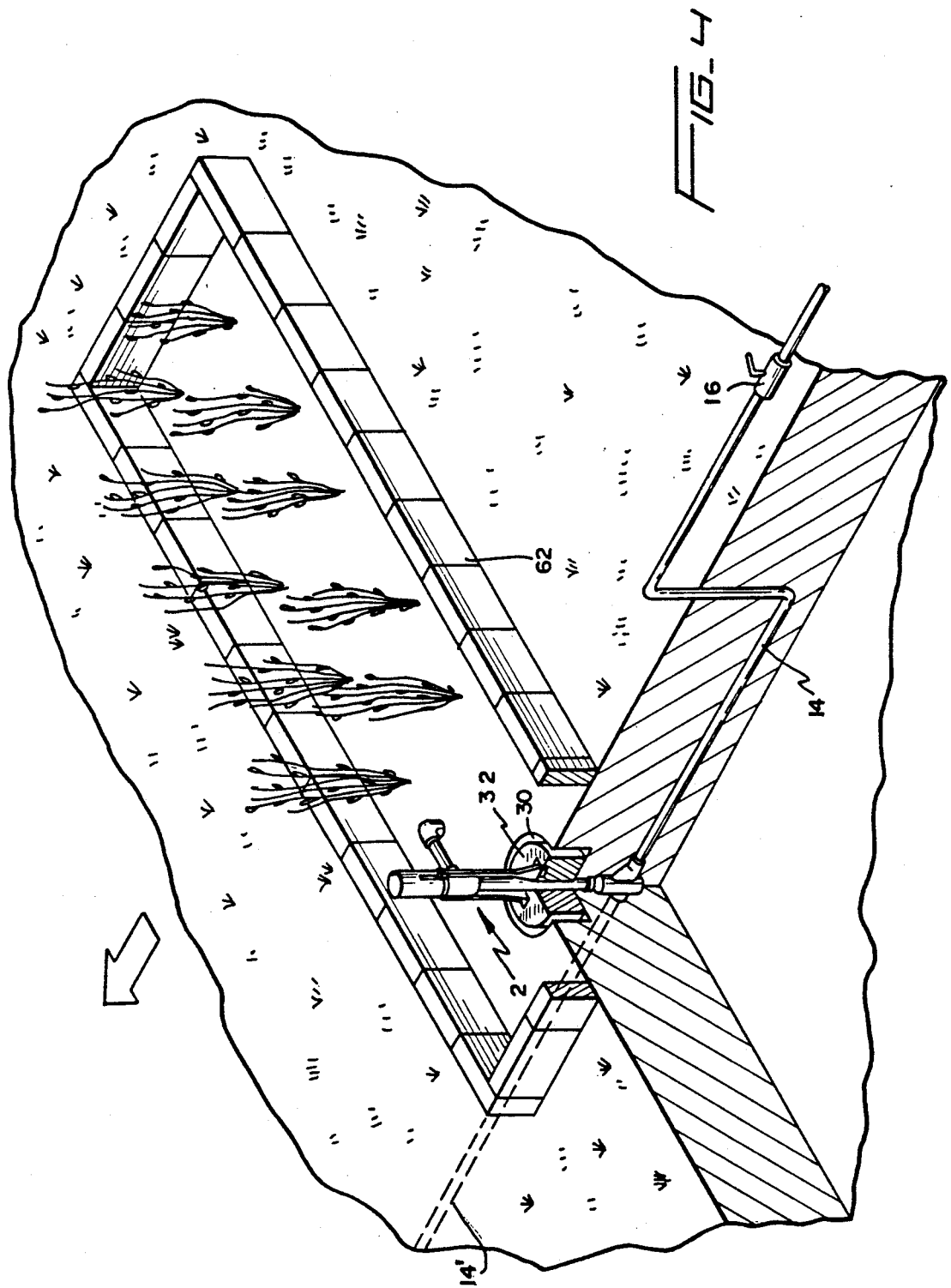

ized source of water. The system includes a hollow valve housing having an upwardly extending hollow cylindrical portion with a first annular opening or outlet in an upper portion thereof. The housing also includes second and thrid annular openings which are preferably axially
IRRIGATION SYSTEM

BACKGROUND OF THE INVENTION

This invention relates to an irrigation system and, more particularly, to an improved apparatus for sequentially irrigating a plurality of areas or basins, automatically stopping the flow of water to an area when that area has received sufficient irrigation and redirecting the flow of water to another area.

Irrigation systems have been used for many years to provide plants and trees with water at various times during their growing cycle. For example, it has been common practice to provide plants and trees with water by means of irrigation ditches, hoses, sprayers, pipes and other types of apparatus. However, in certain situations, such as in orchards where the terrain is uneven, water will run from the high ground to the low. In such cases, the low lying trees may receive more water than those on higher ground.

In other cases, where the cost of water is relatively high it is desirable to control the amount of water provided for each area and to avoid wasting water by providing additional water to some plants in order to adequately water others or by leaving the water on for too long a period.

The above problems have been overcome to a degree by irrigation systems having a plurality of valves with each valve connected by means of pipes to a pressurized source of water. For example, the U.S. patents of Rodieck, U.S. Pat. Nos. 3,797,253 and 4,014,361, disclose systems wherein each item to be watered is provided with a well around its base and a separate valve within each of the wells. In such systems, one or more risers may be provided in order to force each valve that has been closed by the water reaching a preselected height in the well and to remain closed for as long as there is water pressure applied to the system. Such systems also include means to prevent the flow of water to a second valve until such time that a first area has been provided with a predetermined volume of water.

The present invention contemplates an improved irrigation system of the type disclosed by the Rodieck patents, but having spring biasing means for assisting in the opening of one outlet and the closure of another. It is presently believed that the improved irrigation systems disclosed herein will be more reliable in operation, minimize the likelihood that a gate member will become stuck in a first position and thus fail to turn off a valve, and will have a more rapid trigger action and thus provide a more accurate determination of the amount of water provided to a selected area. In addition, it is presently believed that the system disclosed herein may be readily and economically manufactured, will be relatively free of maintenance and simple to operate.

The improved irrigation system disclosed herein also includes means, so that, an individual can manually select areas for additional watering without using a complete watering cycle.

SUMMARY OF THE INVENTION

In essence, an irrigation system according to the present invention is designed for use with a pressurized source of water. The system includes a hollow valve housing having an upwardly extending hollow cylindrical portion with a first annular opening or outlet in an upper portion thereof. The housing also includes second and thrid annular openings which are preferably axially aligned on opposite from one another. The second annular opening or inlet is connected by a pipe to the pressurized source of water, while the third annular opening serves as an outlet and may be connected by suitable pipe means (a distribution pipe) to an inlet in a second valve housing. A valve seat or seat means is associated with each of said outlets and a ball-shaped gate member or ball valve is disposed within the housing and adapted to move upwardly and downwardly within the cylindrical portion of the housing between the outlets. The seat means are constructed and arranged for receiving the ball shaped gate member therein and thereagainst for mating therewith to close each of the outlets.

The irrigation system also includes means for defining a pit and basin which are disposed above the valve housing and float means are disposed within the pit. The irrigation system also includes an upwardly extending pipe which is connected to the first outlet and which extends upwardly above the pit and flow. This upwardly extending pipe also includes an opening or spout means in an open portion thereof for directing the irrigation water outwardly and into the basin when the ball-shaped gate member is blocking the second outlet. Thus, when sufficient water has been applied to the area around the basis, excess water will run into the pit and raise the float. A rod is connected to the top of the ball-shaped gate member and extends upwardly through the upwardly extending pipe and has a spring, preferably a coil spring, fixed to an upper and preferably top portion thereof. In the practice of the invention, the rod has a cap or stop means fixed to the upper end thereof so that the coil spring may be slipped over the rod and rest against the cap or stop means. A displaceable spring biasing member engages a second and preferably the lower portion of the spring, so that any upward movement of the spring biasing member will compress the spring. Connecting means such as a pair of upwardly extending channel members connect the spring biasing means and the float so that when the float is lifted by a change of the level of water in the pit, the spring biasing member is moved upwardly to thereby assert an upward force on the rod by means of the spring. And, when an upward force on the rod exceeds the force of the water holding the ball-shaped gate member in place, the ball will spring upwardly out of engagement with the seat which is associated with said second outlet and into engagement with the seat means which is associated with said first outlet to thereby close off the first outlet and direct the flow of water through the second outlet. Under such conditions the water pressure within the housing will hold the ball in a closed position with respect to the first outlet.

The invention will now be described in connection with the following drawings in which like numerals have been used to identify like parts.

BRIEF DESCRIPTION OF THE DRAWINGS

FIG. 3 is a schematic view which illustrates an irrigation system having a plurality of valve assemblies according to the present invention; and FIG. 4 is an isometric drawing which further illustrates the irrigation system shown in FIG. 3.

DETAILED DESCRIPTION OF THE PREFERRED

Embodiment of the Invention

Figure 1:
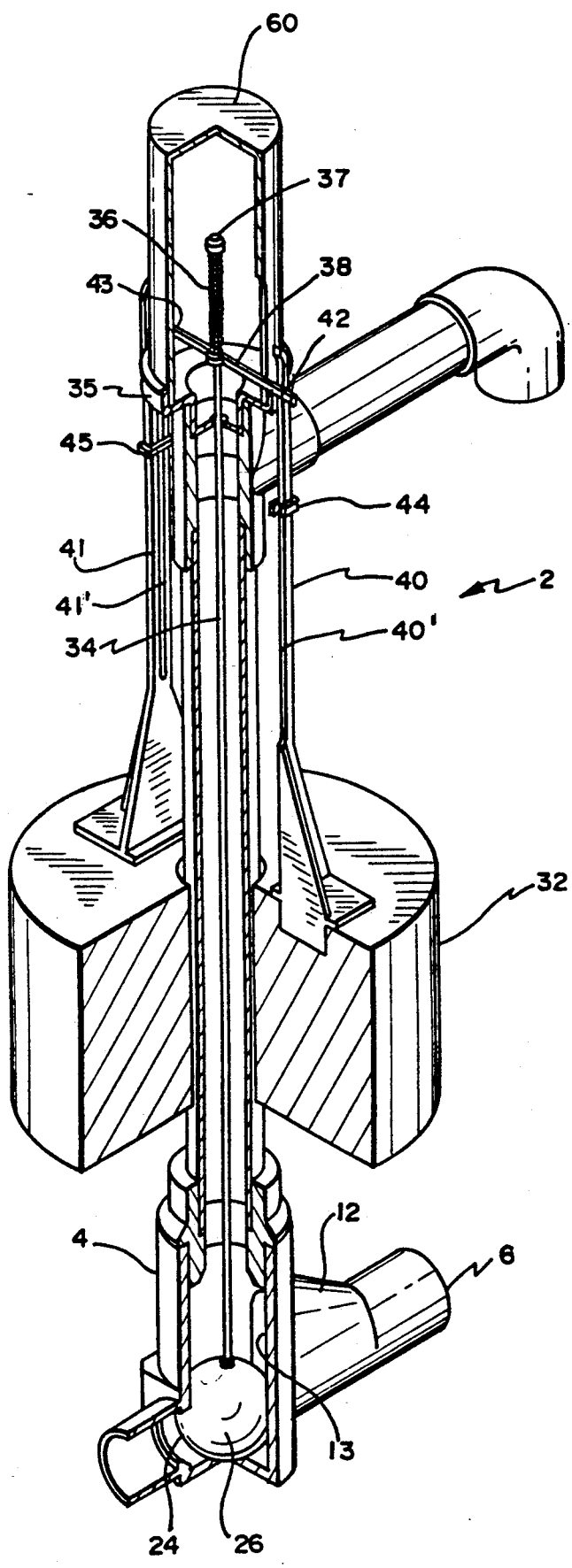
FIG. 1 is an isometric view which is partially broken away to illustrate the operable parts of an irrigation system according to a preferred embodiment of the invention.
Figure 2:
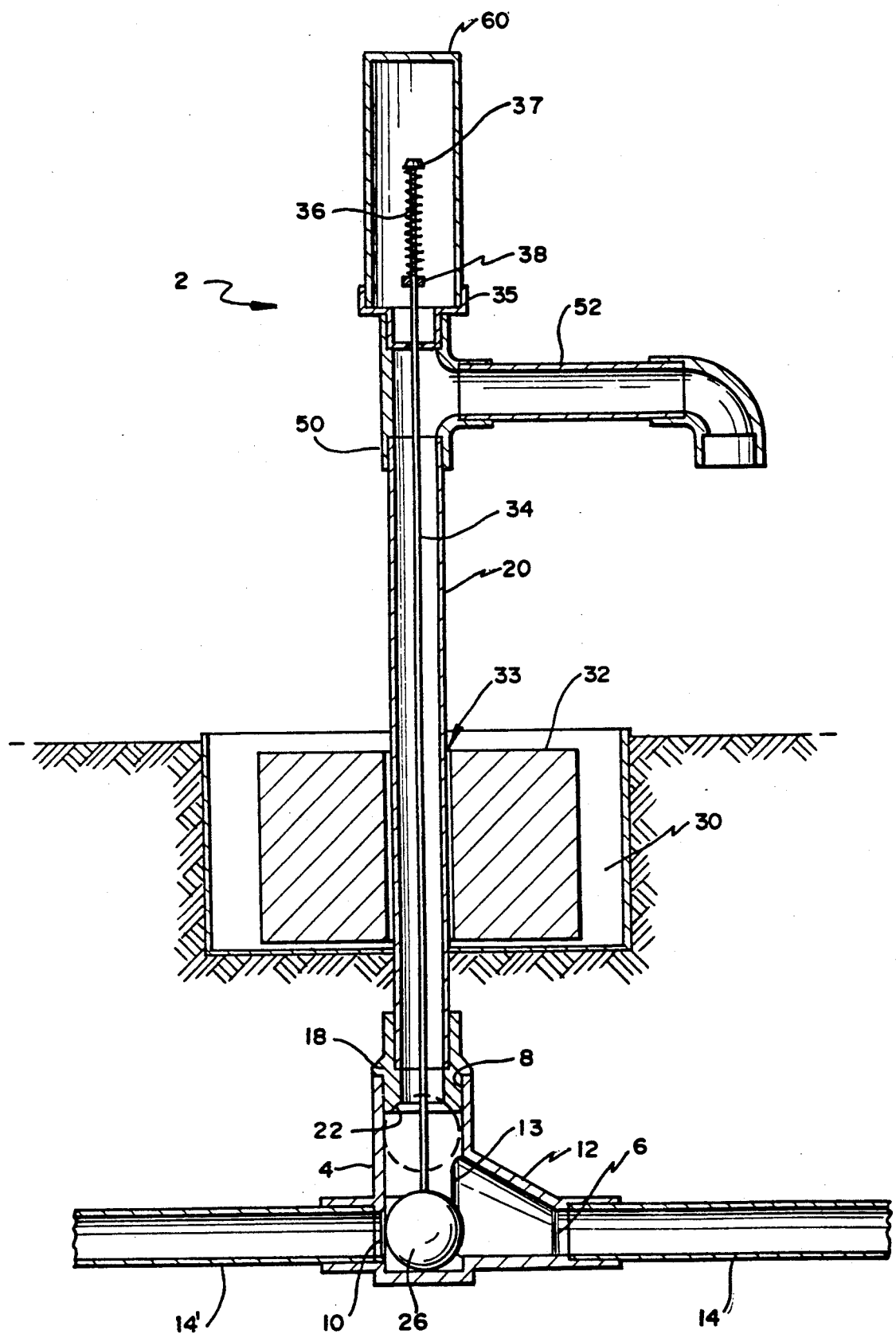
FIG. 2 is cross sectional view taken along the line 2—2 of FIG. 1.

An irrigation system according to a preferred embodiment of the invention includes a plurality of valve assemblies as illustrated in FIGS. 1–4. Each of the valve assemblies 2 may be considered to be an irrigation system per se, but are normally connected together in series for irrigating a plurality of trees or plants sequentially.

The valve assembly 2 includes a hollow cylindrical housing 4 which is preferably disposed on a vertical axis, an annular opening or inlet 6, a second annular opening, a first outlet 8 and a third annular opening or second outlet 10. Each of the annular openings 6, 8 and 10 are constructed and arranged to receive a pipe therein as, for example, by force fit, weld or etc. The housing 4 also defines a portion 12 which extends outwardly and tapers downwardly toward opening 6 to provide a longitudinally enlarged opening 13 on the inner side of housing 4. This enlarged opening 13 is reduced in cross section along a vertical axis as it extends outwardly until it coincides with the right circular cross section of opening 6.

The inlet or opening 6 is connected to a source of pressurized water by means of distribution pipe 14 an valve 16, as is more clearly illustrated in FIG. 3.

The opening 8 in the upper portion on top of housing 4 may be fitted with a suitable coupling 18 which may be force fit in housing 4 and which is constructed and arranged to receive a riser 20 or upwardly extending pipe. The coupling 18 also includes a valve seat 22. A second valve seat 24 is formed in the second outlet 10 and is axially aligned along a horizontal axis with opening 6 and opposite therefrom.

A ball-shaped gate member 26 is disposed in the cylindrical housing 4 and has a diameter that is greater than the diameter of either of the outlets 8 and 10, but is less than the height of the inlet opening in the 13. The sizing of the ball-shaped gate member is important since it is freely fitted within housing 4 and mates with the valve seats 22 and 24 to close each of the outlets. However, the larger opening 6 on the inlet side allows water to flow past the ball-shaped gate member to the upwardly extending pipe or riser 20 when the ball-shaped gate member 26 is against the seat 24 with a minimal obstruction.

The ball-shaped gate member 26, housing 4 and coupling 18 are constructed and arranged so that when the gate member 26 is in its upper position against seat 22, the top of the enlarged opening 13 is below the middle of the gate member 26. Therefore, the flow of water and water pressure will hold the gate member 26 in its closed position.

The housing 4 and distribution pipe 14 are preferably buried in the ground as illustrated more clearly in FIGS. 3 and 4, and a pit 30 is formed immediately above housing 4. The pit 30 may, for example, define a right circular excavation or reservoir of sufficient depth to house a float 32 which actuates the closing of outlet 8 in a manner which will be described hereinafter.

The float 32 is preferably donut-shaped and thus defines a central aperture or opening 33 and is fitted loosely over the upwardly extending pipe or riser 20 so that it will be moved upwardly therealong as the level of water in pit 30 rises.

A rod 34 is connected to the top of gate member 26 and extends upwardly through the upwardly extending pipe or riser 20.

A coil spring 36 is disposed on an upper end of rod 34 and is maintained thereon by a cap 37 which may, for example, be threadedly attached to the top of rod 34. A displaceable spring biasing member 38 defines a central aperture which passes over the rod 34 so that the spring biasing member 38 can move upwardly and downwardly on rod 34 with the spring 36 disposed between the cap 37 and the biasing member 38. Thus, upward movement of the biasing member 38 will compress spring 36 and exert an upward force against the cap 37. The rod 34 also passes loosely through cap means 35 so that a slight pendulum like movement, i.e., pivotal movement on biasing member 38 allows the ball shaped gate member 26 to close outlet 10.

The irrigation system also includes a pair of upwardly extending channel members 40 and 41 which define a pair of elongated channels 40' and 41' for receiving the ends 42 and 43 of biasing member 38 and for guiding the biasing member 38 as it moves upwardly or downwardly with respect to rod 34. The upper ends of the channel members are closed.

A pair of clips 44, 45 are adapted to be moved up or down along channels members 40 and 41 for adjusting the level at which the float will begin to compress spring 36 and effect the movement of the ball-shaped gate member 26 into a second operative position. When the float is moved upwardly, the clips 44, 45 will raise the spring biasing member 38 and compress the spring 36. And, when the force against the cap 37 exceeds the force of the water against the gate member 26, the gate member will spring upwardly against seat 12 to close the upwardly-extending pipe or riser 20 and divert the flow of water through distribution pipe 14'. In addition, the water pressure within the housing will be sufficient to hold the gate member 26 in its upward position.

A coupling 50 and spout assembly 52 are disposed in the upper end of the riser 20 for directing the flow of water onto the area to be irrigated or basin 61.

The operation of an irrigation system in accordance with a preferred embodiment of the invention can be more readily explained with respect to FIG. 3. As illustrated therein, a valve 16 is connected to a pressurized source of water (not shown). Thus, when the valve 16 is opened, water under pressure flows into the inlet 6 of valve assembly 4 and forces a ball valve against a second outlet to close the outlet and force the water upward through the riser 20, and outwardly through the spout 52 and onto the ground of the pit 30 and the basin 61. It is preferred that the area to be irrigated (basin 61) is surrounded by a suitable dike (border) 62 which separates the various basins. And then, when the water reaches a certain level in the basin 61 and hence in the pit 30 surrounding the irrigation system, the float rises up and exerts pressure on the spring 36. Then, when the force exerted by the spring 36 exceeds the force of the water against the gate member 26, the gate member 26 will spring upwardly into engagement with seat 22 to close the first outlet 8 and direct the water through outlet 10 and distribution pipe 14'.

Each of the successive valves 2, 2' etc. then operate in the same way until the entire area to be irrigated has been watered. An individual may then reset selected valve assemblies manually so that a number of plants can receive additional irrigation without requiring a complete recycle. For example, an individual can remove cap 60 and push the end of the rod 34 downwardly to reset a selected valve assembly.

The systems disclosed herein are presently thought to be more reliable than certain prior art systems since they incorporate a closed system, i.e., one which is protected against any irrigation water flowing back into the system. For example, the openings inside the hollow cylinder 4 and the ball-shaped gate member 26 are not exposed to the previously provided irrigation water from the basin 61. Thus, there is little or no chance for water to enter the system.

While the invention has been defined in connection with a preferred embodiment, it should be understood that changes and modifications may be made therein without departing from the scope of the claims.

What is claimed is:

1. An irrigation system for use with a pressurized source of water comprising a hollow valve housing which defines an upwardly extending hollow cylindrical portion having a first annular outlet in an upper portion thereof, said housing also defining an inlet in a lower portion thereof for connecting said housing to the pressurized source of water, said housing further defining a second annular outlet in the lower portion thereof, a ball-shaped gate member disposed within said housing and adapted to move upwardly and downwardly within said cylindrical portion, and seat means associated with each of said outlets and adapted for receiving said ball-shaped gate member therein and thereagainst for closing each of said outlets, means for defining a pit, and float means disposed in said pit, an upwardly-extending pipe connected to said first outlet and extending above said pit, outlet means in an upper portion of said upwardly-extending pipe so that when said ball-shaped gate member is in a first position against said seat means associated with said second outlet to thereby close said second outlet, water from the pressurized source flows through said inlet, said housing, said first outlet and said upwardly extending pipe and out of said outlet means to fill said pit, a rod connected to said gate member and extending upwardly through said upwardly-extending pipe, and a spring having a first portion fixed to said rod, and a displaceable spring biasing member engaging a second portion of said spring, so that, movement of said spring biasing member with respect to said rod changes a force which is exerted against said rod by said spring, and means connecting said spring biasing member and said float so that the upward movement of said float in response to an increase in the water level in said pit is transferred to said spring biasing member to thereby increase the force on said rod until such force exceeds the force of the flow of water against said ball-shaped gate member whereupon the ball-shaped gate member spring out of said seat means which is associated with said second outlet and upwardly into engagement with said seat means which is associated with said first outlet to thereby close said outlet and direct the flow of water through said second outlet.

2. An irrigation system according to claim 1 in which said displaceable spring biasing member defines a bar-like structure having a central aperture and in which an upper portion of said rod passes through said aperture, and wherein said spring is a coil spring which is disposed coaxially with said rod above said biasing member and between said biasing member and an upper end of said rod so that raising the spring biasing member compresses said spring to thereby increase the upward force against said end of said rod.

3. An irrigation system according to claim 2 in which said connecting means includes a pair of upwardly extending channel members which are fixed to said float and which define a pair of channels for receiving the ends of said biasing member therein and for permitting limited upward movement of said channel member without corresponding movement of said biasing member, and means for lifting said biasing member when the limited upward movement has been exceeded.

4. An irrigation system according to claim 3 in which said lifting means comprises a pair of movable clip means which may be moved along the channels to adjust the height at which the float will begin to compress said spring.

5. An irrigation system according to claim 4 which includes spout means extending outwardly from said opening in the upper portion of the upwardly extending pipe for directing a flow of water to an area which is beyond said pit.

6. An irrigation system for use with a pressurized source of water comprising a generally vertically disposed hollow cylindrical housing having an open upper end and a closed bottom, a coupling defining a first valve seat and a coupling fitted into and sealingly engaging the open end of said housing, to thereby form a first outlet, said housing also defining an inlet and a second outlet in a lower portion thereof and opposite from one another along a horizontal axis, said inlet defining an opening which is larger than the opening for either of said outlets and which is constructed and arranged to connect said housing to the pressurized source of water, a generally spherically shaped gate member disposed within said cylindrical housing and having a diameter which is slightly smaller than the diameter of said housing for movement between the upper and lower portions thereof and for lateral movement between said inlet and said second outlet, a second valve seat formed in said second outlet and adapted to receive said spherically-shaped gate member thereagainst and to thereby close said second outlet when a flow of water through said inlet laterally displaces said gate member into engagement with said second seat, means defining a pit disposed above said housing and a float having a central aperture extending therethrough disposed in said pit, an upwardly extending pipe connected to said first outlet and extending upwardly through said pit and through the central aperture in said float, outlet means in an upper portion of said upwardly extending pipe which is above said pit and spout means connected to said outlet means for directing a flow of water outwardly beyond said pit so that water for irrigation will saturate the area around the irrigation system and excess water will flow into said pit, a rod fixed to the top of said spherical gate member and extending upwardly through said upwardly extending pipe and above said spout means, a spring biasing member defining a bar-like structure having a central opening slidably disposed on said rod and a pair of ends extending outwardly from said aperture, and a coil spring disposed coaxially on said rod with a first end thereof fixed to the upper end of said rod and with the opposite end thereof engaging said spring biasing member, means for positioning said upper portion of said rod in the center of said upwardly extending pipe and/or permitting pendulum-like movement of said rod when said rod pivots about said spring biasing member, a pair of upwardly extending channel members fixed to said float and defining a pair of vertically extending channels for receiving the ends of said biasing member for movement therein and a pair of adjustable clip means for movement along the channel and for moving the spring biasing member upwardly in response to the upward movement of said float so that the upward movement of said float compresses said spring until the upwardly directed force against said rod exceeds the force of the water against said gate member and causes said gate member to spring upwardly into engagement with said first seat means to thereby close said outlet and direct the flow of water through said second outlet, and wherein the force of said water against said gate member maintains the gate member in the open position until the water pressure is reduced or the gate member is manually forced downward into a first position.

* * * * *